(12) United States Patent
Nakamura et al.

(10) Patent No.: US 7,714,894 B2
(45) Date of Patent: May 11, 2010

(54) REMOTE HEAD CAMERA

(75) Inventors: Hidetaka Nakamura, Kanagawa (JP);
Hiroshi Shinozaki, Tokyo (JP); Tetsuo Sakurai, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/338,832

(22) Filed: Dec. 18, 2008

(65) Prior Publication Data
US 2009/0185048 A1 Jul. 23, 2009

(30) Foreign Application Priority Data
Jan. 18, 2008 (JP) .............................. 2008-009587

(51) Int. Cl.
H04N 5/232 (2006.01)
H04N 5/228 (2006.01)
(52) U.S. Cl. .............................. 348/211.14; 348/222.1
(58) Field of Classification Search ............ 348/211.14, 348/211.13, 45, 72, 73
See application file for complete search history.

(56) References Cited
U.S. PATENT DOCUMENTS

| | | | | |
|---|---|---|---|---|
| 4,782,393 | A * | 11/1988 | Kawamura | ............. 348/211.14 |
| 6,295,084 | B1 * | 9/2001 | Nishizawa et al. | ....... 348/211.1 |
| 6,449,007 | B1 | 9/2002 | Yokoyama et al. | |
| 6,975,351 | B2 * | 12/2005 | Ikeda et al. | ............ 348/211.14 |
| 2004/0028390 | A9 * | 2/2004 | Chatenever et al. | ......... 386/107 |
| 2006/0176381 | A1 * | 8/2006 | Centen | ....................... 348/294 |

FOREIGN PATENT DOCUMENTS

| | | |
|---|---|---|
| JP | 09-219812 | 8/1997 |
| JP | H10-042176 | 2/1998 |
| JP | 10-224664 | 8/1998 |
| JP | H11-355645 | 12/1999 |
| JP | 2006-229448 | 8/2006 |
| JP | 2008-005150 | 1/2008 |
| WO | WO 96/28930 | 9/1996 |

OTHER PUBLICATIONS

Japanese Patent Application No. 2008-009587 English translation of the Office Action mailed Mar. 17, 2009.

* cited by examiner

*Primary Examiner*—Luong T Nguyen
(74) *Attorney, Agent, or Firm*—Blakely, Sokoloff, Taylor & Zafman LLP.

(57) ABSTRACT

According to one embodiment, a remote head camera includes a camera control unit, and a camera head configured to be connected to the camera control unit and including an imaging device, a drive signal generator, and a format identifying unit. The drive signal generator generates a drive signal for driving the imaging device. The format identifying unit identifies a format of the imaging device based on a clock count in a synchronization period from a first synchronization pulse to a second synchronization pulse output after the first synchronization pulse. The first synchronization pulse and the second synchronization pulse constitutes a synchronization signal.

5 Claims, 2 Drawing Sheets

REMOTE HEAD CAMERA

CROSS-REFERENCE TO RELATED APPLICATIONS

This application is based upon and claims the benefit of priority from Japanese Patent Application No. 2008-009587, filed Jan. 18, 2008, the entire contents of which are incorporated herein by reference.

BACKGROUND

1. Field

One embodiment of the invention relates to a remote head camera that includes a remote camera head configured to be connected to a camera control unit.

2. Description of the Related Art

Remote head cameras have been known as small cameras with an imaging device such as CCD (charge-coupled device).

The remote head camera is generally provided with a camera head (hereinafter also simply referred to as "head") and a camera control unit (CCU), which are connected to each other via a dedicated camera cable. The camera head outputs a pixel signal obtained by the imaging device such as CCD. The camera control unit (CCU) includes a signal processing circuit for obtaining a video signal for display based on the pixel signal from the camera head.

In the remote head camera, the CCU outputs the video signal to a display device. The display device then displays an image of an object captured by the head so that it can be viewed thereon.

For example, Japanese Patent Application Publication (KOKAI) No. 2006-229448 discloses a conventional remote head camera. This conventional remote head camera includes a CCU provided with an information transmitting unit and a head provided with an identifying unit. The information transmitting unit outputs a variety of information to the head, while the identifying unit identifies the type of the information. With this, the head can change default settings according to the CCU.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Figure 1:
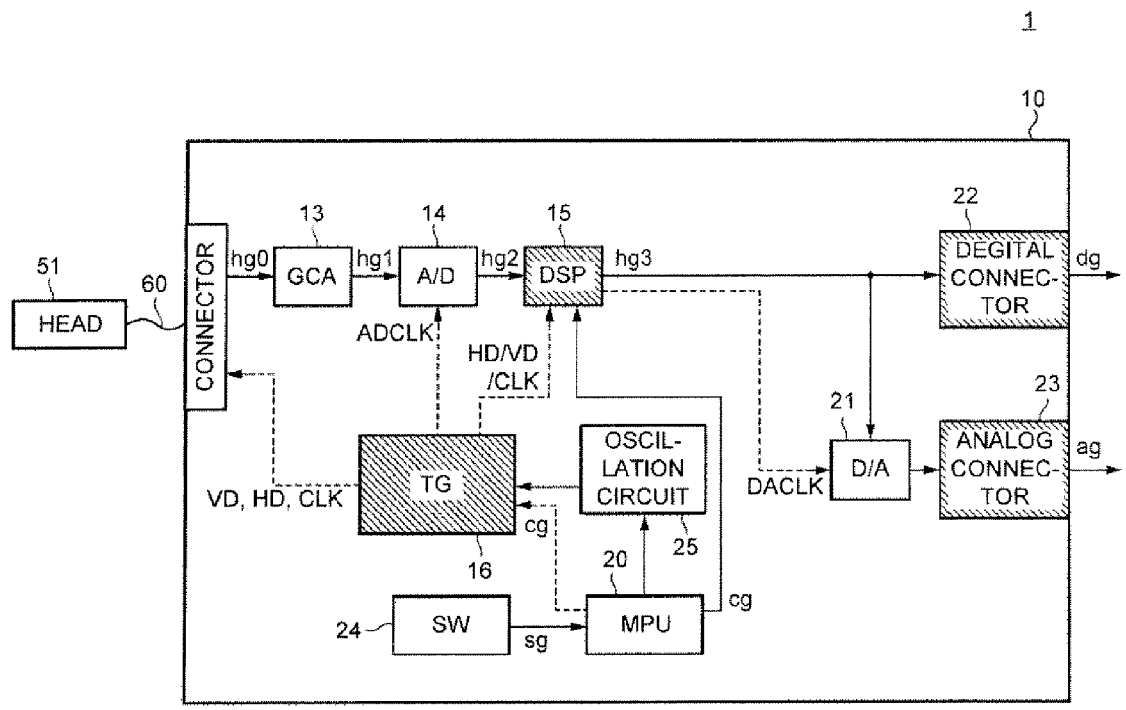
FIG. 1 is an exemplary block diagram of a remote head camera according to an embodiment of the invention.

Various embodiments according to the invention will be described hereinafter with reference to the accompanying drawings. In general, according to one embodiment of the invention, a remote head camera includes a camera control unit, and a camera head configured to be connected to the camera control unit and including an imaging device of multi-format type, a drive signal generator, and a format identifying unit. The drive signal generator generates a drive signal for driving the imaging device. The format identifying unit identifies a format of a video signal to be output from the imaging device based on the number of clocks from the camera control unit in a synchronization period from a first synchronization pulse to a second synchronization pulse output after the first synchronization pulse. The first synchronization pulse and the second synchronization pulse constitutes a synchronization signal from the camera control unit. The camera control unit includes a format switching unit and a timing signal output unit. The timing signal output unit outputs the synchronization signal and the clocks at a frequency corresponding to switching operation of the format switching unit.

The CCU 10 includes a connector 12, a gain control amplifier (GCA) 13, an AD converter (A/D) 14, and a digital signal processor (DSP) 15.

The CCU 10 further includes a timing generator (TG) 16, an MPU (Micro Processing Unit) 20, a DA converter (D/A) 21, a digital connector 22, and an analog connector 23. Still further, the CCU 10 includes a format selector switch (SW) 24 and an oscillation circuit 25.

The camera cable 60 is connected to the connector 12. The connector 12 has a plurality of connection terminals (not shown) corresponding to the camera cable 60.

The gain control amplifier 13 amplifies an imaging signal hg0 output from the connector 12 and outputs an imaging signal hg1. The AD converter 14 receives an AD clock signal (ADCLK) output from the timing generator 16, converts the amplified imaging signal hg1 into a digital signal, and outputs an imaging signal hg2.

The digital signal processor 15 receives a clock signal (CLK), an HD signal (a horizontal synchronization signal), and a VD signal (a vertical synchronization signal) output from the timing generator 16, performs predetermined digital signal processing on the imaging signal hg2 converted into the digital signal, and outputs a video signal hg3 to display an image on a display device (not shown). Besides, the digital signal processor 15 includes a plurality of video signal processing circuits that process the video signal hg3 that varies according to the video signal format of a COD 51a of the head 51 (hereinafter refereed to as "COD format")

The timing generator 16 includes an FPGA (Field Programmable Gate Array). The timing generator 16 outputs the clock signal (CLK), the HD signal (the horizontal synchronization signal), and the VD signal (the vertical synchronization signal) to the digital signal processor 15 and also to the head 51 via the connector 12.

The MPU 20 outputs a switch control signal cg for the CCD format to the digital signal processor 15 and the timing generator 16 when changing the format of the head 51.

The MPU 20 outputs the switch control signal cg when an operation signal sg is output from the format selector switch 24. In response to the output of the switch control signal cg, the timing generator 16 and the digital signal processor 15 perform operations suitable for the changed format.

The DA converter (D/A) 21 converts the video signal hg3 into an analog signal and outputs the analog signal to the analog connector 23. The digital connector 22 is a connection terminal for outputting a digital video signal dg to an external device. The analog connector 23 is a connection terminal for outputting an analog video signal ag to an external device.

The format selector switch 24 is arranged on, for example, a main body of the CCU 10. The format selector switch 24 is manually slid by a user to select a format. Instead of being a slide switch or the like which is slid to change the format, the format selector switch 24 can change the format to one selected from a menu displayed on the screen. The format selector switch 24 outputs the operation signal sg according to the operation to the MPU 20.

The oscillation circuit 25 includes a plurality of oscillators each oscillating at a different frequency for each format. In response to the operation signal from the MPU 20, a corresponding oscillator operates to generate a clock signal (CLK) at a frequency corresponding to the format and outputs the generated clock signal (CLK) to the timing generator 16.

Figure 2:
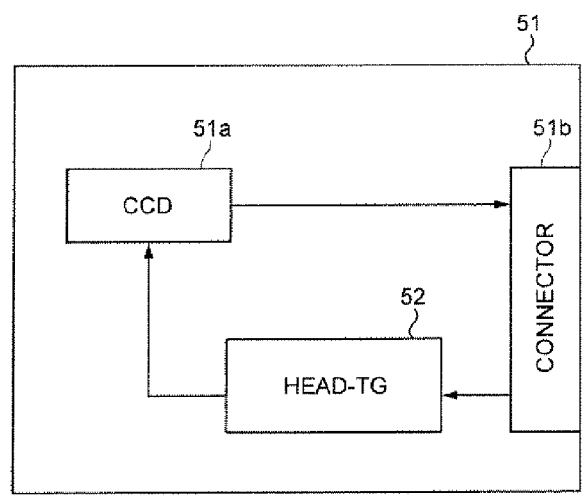
FIG. 2 is an exemplary block diagram of a head in the embodiment.

Described below is the configuration of the head 51. The head 51 includes, as illustrated in FIG. 2, the CCD 51a, a connector 51b to which the camera cable 60 is connected, and an in-head timing generator (HEAD-TG) 52.

The CCD 51a generates a pixel signal according to an optical image of an object formed by a lens (not shown) in the head 51, and outputs the pixel signal via the connector 51b. The CCD 51a outputs the pixel signal according to a drive pulse output from the in-head timing generator 52. The CCD 51a is of multi-format type, and its CCD format changes in response to the drive pulse switching.

Figure 3:
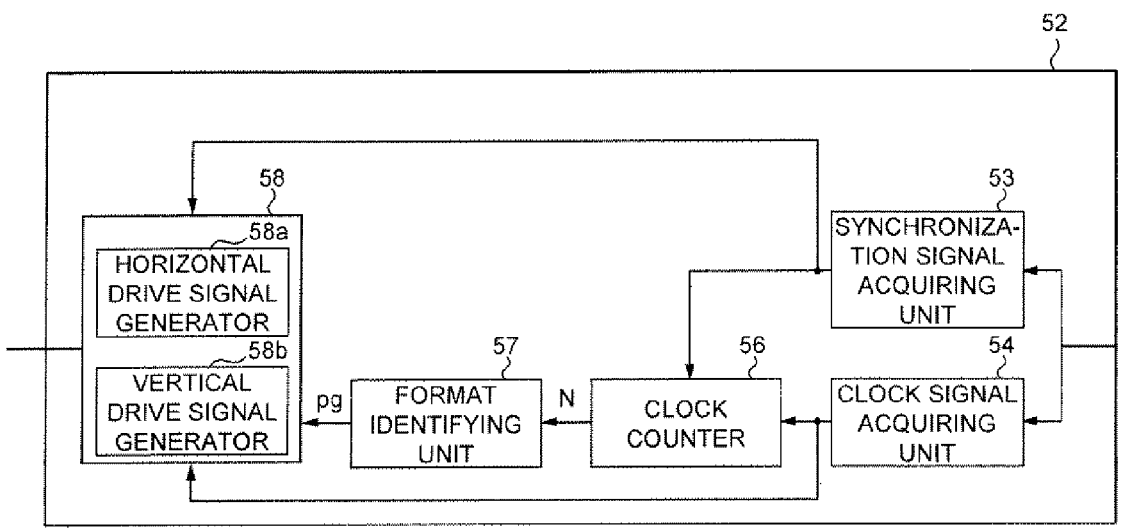
FIG. 3 is an exemplary block diagram of an in-head timing generator in the embodiment.

The in-head timing generator 52 includes, as illustrated in FIG. 3, a synchronization signal acquiring unit 53, a clock signal acquiring unit 54, a clock counter 56, a format identifying unit 57, and a drive signal generator 58.

The synchronization signal acquiring unit 53 receives the vertical synchronization signal (VD signal), the horizontal synchronization signal (HD signal), and the clock signal output from the CCU 10 via the connector 51b, and outputs, from among them, the VD signal and the HD signal thus acquired to the clock counter 56 and the drive signal generator 58. The clock signal acquiring unit 54 acquires the clock signal via the connector 51b, and outputs it to the clock counter 56 and the drive signal generator 58.

The clock counter 56 counts clock pulses in a predetermined period (for example, a horizontal synchronization period) to obtain a clock pulse count N. The clock counter 56 then outputs the clock pulse count N to the format identifying unit 57.

The format identifying unit 57 identifies the CCD format based on the clock pulse count N, and outputs an identification signal pg indicating the identification result to the drive signal generator 58.

The drive signal generator 58 includes a horizontal drive signal generator 58a and a vertical drive signal generator 58b for driving the CCD and outputs a CCD drive pulse to the CCD 51a. The drive signal generator 58 has a function as a switching unit which switches the drive pulse according to the identification signal pg.

In the remote head camera 1 configured as above, the head 51 identifies the CCD format.

In the head 51, the VD signal, the HD signal and the clock signal are input to the connector 51b via the camera cable 60.

Figure 4:
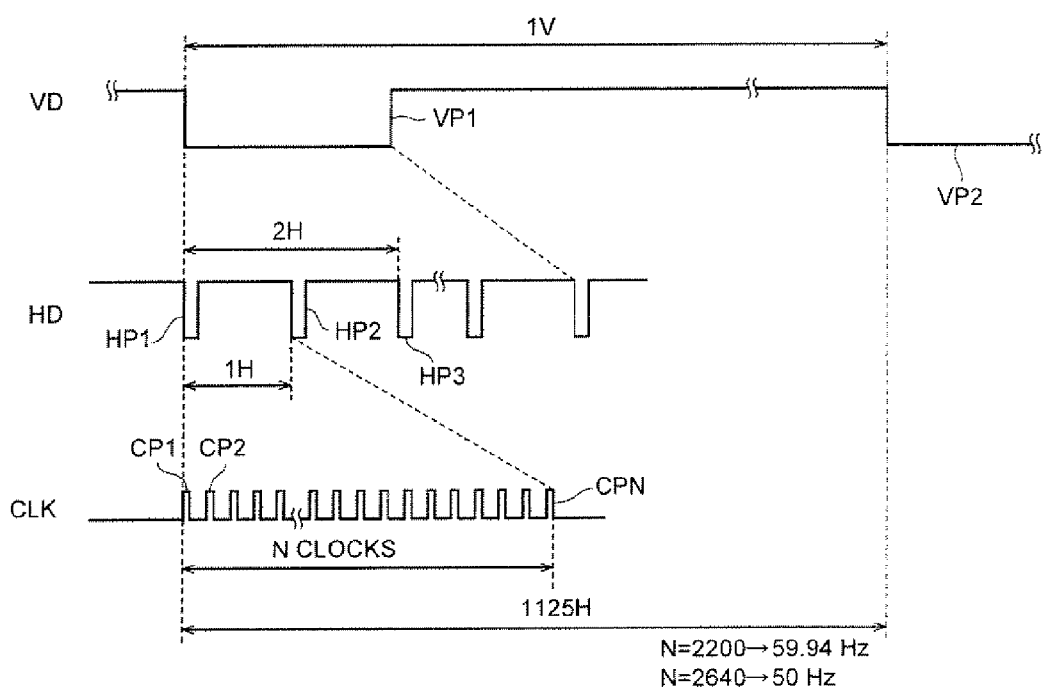
FIG. 4 is an exemplary diagram of a VD signal, an HD signal, and a clock signal in the embodiment.

An example of these VD signal, the HD signal and the clock signal are illustrated in FIG. 4. The VD signal is a synchronization signal in which a synchronization period (a vertical synchronization period) 1V from a vertical synchronization pulse VP1 to a next vertical synchronization pulse VP2 is repeated.

The HD signal is a synchronization signal in which a synchronization period (a horizontal synchronization period) 1H from a horizontal synchronization pulse HP1 to a horizontal synchronization pulse HP2 immediately thereafter is repeated. The HD signal includes a plurality of horizontal synchronization pulses HP1, HP2, HP3, ... in the vertical synchronization period 1V. The vertical synchronization period 1V corresponds to 1125 times (1125 Hs) the horizontal synchronization period 1H in the case of a high-vision camera.

The clock signal includes a plurality of clock pulses CP1, CP2, ... in the horizontal synchronization period 1H.

The VD signal, the HD signal and the clock signal as described above are input to the synchronization signal acquiring unit 53 and the clock signal acquiring unit 54. The synchronization signal acquiring unit 53 outputs the VD signal and the HD signal to the clock counter 56, and the clock signal acquiring unit 54 outputs the clock signal to the clock counter 56.

Upon detecting the vertical synchronization pulse VP1, the clock counter 56 counts clock pulses between the horizontal synchronization pulse HP1 (a first synchronization pulse) and the horizontal synchronization pulse HP2 (a second synchronization pulse) immediately thereafter of the HD signal to obtain the clock pulse count N, and outputs the clock pulse count N to the format identifying unit 57. This ensures that the clock counter 56 obtains the clock pulse count N in the horizontal synchronization period 1H upon detecting the vertical synchronization pulse VP1, and outputs the clock pulse count N to the format identifying unit 57.

The format identifying unit 57 identifies, based on the clock pulse count N, the format changed in the CCD 10 and outputs the identification signal pg indicating the identification result to the drive signal generator 58. The drive signal generator 58 then generates a drive pulse according to the identification signal pg and outputs it to the CCD 51a.

In FIG. 4, although a plurality of clock pulses (CP1, CP2, ... are output in the horizontal synchronization period 1H, the clock pulse count N in the horizontal synchronization period 1H varies according to the format. That is, when the format changes, the clock pulse count N in the horizontal synchronization period 1H also changes. Focusing attention on this point, the remote head camera 1 is configured such that the clock counter 56 obtains the clock pulse count N in the horizontal synchronization period 1H, and the format identifying unit 57 identifies the CCD format based on the clock pulse count N.

It is assumed herein that the head 51 is of multi-format type compatible with formats 1080 59.94i and 1080 50i. In this case, the format identifying unit 57 determines that the format is 1080 59.94i when the clock pulse count N is "2020" and that the format is 1080 50i when the clock pulse count N is "2640".

As described above, the remote head camera 1 identifies the CCD format based on the clock pulse count N in the horizontal synchronization period 1H. This eliminates the need for the CCU 10 to feed the head 51 with the identification signal for identifying the CCD format.

Accordingly, the remote head camera 1 can cope with changes in the CCD format in the multi-format head 51 without sending the identification signal from the CCU 10 to the head 51. Therefore, in the remote head camera 1, the camera cable 60 does not require an additional wire for sending the identification signal.

Even if CCD formats available for the head 51 increase, the camera cable 60 which has been used so far does not need to be replaced and can be still used.

Further, a camera cable compatible with a single format can be used as the camera cable 60 for the multi-format head 51, which increases the versatility of the camera cable 60.

Furthermore, the head 51 does not need a line for receiving the identification signal. Thus, a substrate used for a head which does not need the identification signal can be used, which increases the versatility of the substrate.

In the above description, the CCD format is identified based on the clock pulse count N in the horizontal synchronization period 1H from the first horizontal synchronization pulse HP1 to the next horizontal synchronization pulse H2 upon detection of the vertical synchronization pulse VP1. However, the CCD format may be identified based on the clock pulse count in a horizontal synchronization period 2H from the first horizontal synchronization pulse HP1 to a horizontal synchronization pulse after the horizontal synchronization pulse HP2 (for example, from the horizontal synchronization pulse HP1 to a horizontal synchronization pulse HP3 immediately after the horizontal synchronization pulse HP2).

Further, the head 51 may identify the CCD format based on the clock pulse count in a horizontal synchronization period determined by other horizontal synchronization pulses HP. However, when a certain period has elapsed since the output of the first horizontal synchronization pulse HP1, the CCD 51a outputs a pixel signal and the CCU 10 outputs a video signal. Therefore, in the case that a certain period has elapsed since the output of the first horizontal synchronization pulse HP1 before clock pulses are counted and that the CCD format is identified and the drive pulse is changed, an image is likely to be affected due to noise mixed in the video signal or the like.

For this reason, it is preferable to identify the CCD format based on the clock pulse count N obtained in the horizontal synchronization period 1H from the first horizontal synchronization pulse HP1 to the horizontal synchronization pulse HP2 immediately thereafter.

The CCD format may also be identified based on the clock pulse count obtained in the vertical synchronization period 1V from the vertical synchronization pulse VP1 to the next vertical synchronization pulse VP2. In this case, however, since the vertical synchronization period 1V includes horizontal synchronization pulses HP1 for 1125 Hs, there is need to count a large number of clock pulses, leading to an increase in circuit size and processing load.

Therefore, it is preferable to count clock pulses based on the horizontal synchronization signal HD, and identify the CCD format and change the drive pulse based on the clock pulse count.

The above circuits (for example, the in-head timing generator 52) are described by way of example only, and the remote head camera can include circuits other than them.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A remote head camera comprising:
   a camera control unit; and
   a camera head configured to be connected to the camera control unit, wherein the camera head includes
   an imaging device of multi-format type,
   a drive signal generator configured to generate a drive signal for driving the imaging device, and
   a format identifying unit configured to identify a format of a video signal to be output from the imaging device based on a number of clocks from the camera control unit in a synchronization period from a first synchronization pulse to a second synchronization pulse output after the first synchronization pulse, the first synchronization pulse and the second synchronization pulse constituting a synchronization signal from the camera control unit and
   the camera control unit includes
   a format switching unit, and
   a timing signal output unit configured to output the synchronization signal and the clocks at a frequency corresponding to switching operation of the format switching unit.

2. The remote head camera according to claim 1, wherein
   the synchronization signal output from the camera control unit is a horizontal synchronization signal, and
   the synchronization period is a horizontal synchronization period.

3. The remote head camera according to claim 1, wherein
   the camera head further includes a counter configured to count clock pulses constituting a clock signal to obtain a clock count, and
   the format identifying unit identifies the format of the imaging device based on the clock count obtained by the counter.

4. The remote head camera according to claim 3, wherein
   the synchronization signal is a horizontal synchronization signal, and
   the first synchronization pulse is a horizontal synchronization pulse, and the second synchronization pulse is a horizontal synchronization pulse output immediately after the first synchronization pulse.

5. The remote head camera according to claim 3, wherein
   the synchronization signal includes a horizontal synchronization signal and a vertical synchronization signal,
   the first synchronization pulse is a horizontal synchronization pulse, and the second synchronization pulse is a horizontal synchronization pulse output immediately after the first synchronization pulse, horizontal synchronization pulses constituting the horizontal synchronization signal, and
   the counter obtains, upon detecting a vertical synchronization pulse constituting the vertical synchronization signal, the clock count to output the clock count to the format identifying unit.

* * * * *